United States Patent
Kim et al.

(10) Patent No.: US 7,830,244 B2
(45) Date of Patent: Nov. 9, 2010

(54) BACK WARNING SYSTEM AND METHOD FOR VEHICLE

(75) Inventors: Ho-kyung Kim, Gyeonggi-do (KR); Byung-bae Min, Gyeonggi-do (KR); Jae-yong Rew, Gyeonggi-do (KR)

(73) Assignee: Hyundai Autonet Co., Ltd., Icheon-si (KR)

( * ) Notice: Subject to any disclaimer, the term of this patent is extended or adjusted under 35 U.S.C. 154(b) by 349 days.

(21) Appl. No.: 12/028,920

(22) Filed: Feb. 11, 2008

(65) Prior Publication Data

US 2008/0284617 A1   Nov. 20, 2008

(30) Foreign Application Priority Data

May 18, 2007   (KR) ...................... 10-2007-0048601

(51) Int. Cl.
    *B60Q 1/00* (2006.01)
(52) U.S. Cl. .................. 340/435; 340/436; 340/463; 340/903; 340/932.2; 180/169; 701/45
(58) Field of Classification Search ............. 340/463, 340/435, 436, 438, 439, 539.1, 539.22, 539.23, 340/903, 932.2, 933; 180/168, 169; 701/45
    See application file for complete search history.

(56) References Cited

U.S. PATENT DOCUMENTS

| | | | |
|---|---|---|---|
| 6,114,950 A * | 9/2000 | Schaible et al. | 340/435 |
| 6,128,576 A * | 10/2000 | Nishimoto et al. | 701/301 |
| 6,445,285 B1 * | 9/2002 | Sparling | 340/436 |
| 7,126,461 B2 * | 10/2006 | Takeichi et al. | 340/435 |
| 2006/0038664 A1 | 2/2006 | Park | |
| 2006/0107763 A1 | 5/2006 | Paek | |
| 2007/0023609 A1 | 2/2007 | Moon | |

FOREIGN PATENT DOCUMENTS

| | | |
|---|---|---|
| KR | 10-2003-0010892 | 2/2003 |
| KR | 10-2003-0047672 | 6/2003 |

OTHER PUBLICATIONS

English language Abstract of KR 10-2003-0047672.
English language Abstract of KR 10-2003-0010892.

* cited by examiner

*Primary Examiner*—Hung T. Nguyen
(74) *Attorney, Agent, or Firm*—NSIP Law

(57) ABSTRACT

A back warning system and method for a vehicle are provided. The system includes an electronic system and a plurality of sensor units. When the vehicle is backed, the electronic system transmits a sensor drive message and then generates a warning based on a received warning level. The sensor units are driven when receiving the sensor drive message, sense a distance from a rear obstacle, and transmit a warning level corresponding to the sensed distance to the electronic system.

14 Claims, 5 Drawing Sheets

BACK WARNING SYSTEM AND METHOD FOR VEHICLE

BACKGROUND OF THE INVENTION

1. Field of the Invention

The present invention relates to a Back Warning System (BWS) for a vehicle, and more particularly, to a back warning system and method for a vehicle, for more simplifying an electronic system of the vehicle by constructing a sensor unit having a data communication function and a control function.

2. Description of the Related Art

In general, a back warning system for a vehicle is a system having four ultrasonic sensors installed in a rear bumper of the vehicle, for generating a warning depending on a distance from an obstacle in a backing or parking mode, to help a driver to back or park a car with safety.

FIG. 1 is a block diagram illustrating a schematic construction of a vehicular electronic system including a BWS. A description is made below with reference to FIG. 1.

An Electronic Control Unit (ECU) 20 of the BWS is provided at a left side or right side of an engine room of a vehicle. A buzzer 29 is installed in the interior of the vehicle. Four sensors 21, 23, 25, and 27 are installed in a rear bumper of the vehicle.

With the development of car and electronic technologies, a vehicle includes a plurality of ECUs such as an Airbag Control Module (ACM) ECU 30 and a Transmission Control Unit (TCU) 40 in addition to the ECU 20 of the BWS. And, the vehicle includes a power line for supplying power to the ECUs and a plurality of control lines connecting the ECU with control targets.

Because many electronic systems are installed in a car with a space limited as described above, there is a drawback that it is difficult to secure a space for additionally installing new electronic systems as the number of ECUs increases.

Also, there is a drawback that many lines of conventional vehicular electronic systems make the interior of a vehicle complex and make a weight of the vehicle increase, thereby resulting in degrading fuel efficiency of the vehicle.

In order to provide a solution to these drawbacks, a research on a diversity of methods for minimizing the number of lines of the vehicular electronic system has been conducted.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a back warning system and method for a vehicle, for more simplifying a vehicular electronic system by constructing a sensor unit having a data communication function and a control function.

According to one aspect of the present invention, there is provided a back warning system for a vehicle. The system includes a buzzer for generating a warning, a data communication unit for performing data communication, an electronic system, and a plurality of sensor units. If a condition for back warning operation is satisfied, the electronic system generates and transmits a sensor drive message through the data communication unit. If receiving a warning message including a warning level in response to the sensor drive message, the electronic system generates a warning according to the warning level. The sensor unit includes a sensor and a data communication unit corresponding to the data communication unit of the electronic system. The sensor unit receives the drive message through the data communication unit and drives the sensor, and generates a warning message including a warning level value depending on a sensing value input through the sensor and transmits the warning message to the electronic system through the data communication unit.

According to another aspect of the present invention, there is provided a back warning method for a vehicle. The method includes generating and transmitting, by an electronic system, a sensor drive message if a condition for back warning operation is satisfied; in a sensor unit, receiving the drive message, driving the sensor, generating a warning message including a warning level value depending on a sensing value input through the sensor, and transmitting the warning message to the electronic system; and in the electronic system, receiving the warning message and generating a warning depending on the warning level.

According to a further another aspect of the present invention, there is provided a back warning system for a vehicle. The system includes a plurality of sensor units and an electronic system. The sensor unit includes a sensor and a data communication unit for performing data communication. When power is supplied, the sensor unit drives the sensor, generates a warning message including a warning level value corresponding to a sensing value input through the sensor, and transmits the warning message through the data communication unit. The electronic system includes a buzzer for generating a warning and a data communication unit corresponding to the data communication unit. If a condition for back warning operation is satisfied, when receiving a warning message including the warning level value from the sensor units through the data communication unit, the electronic system generates a warning depending on the warning level.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF THE INVENTION

Exemplary embodiments of the present invention will now be described in detail with reference to the annexed drawings. In the following description, a detailed description of known functions and configurations incorporated herein has been omitted for conciseness.

Figure 1:
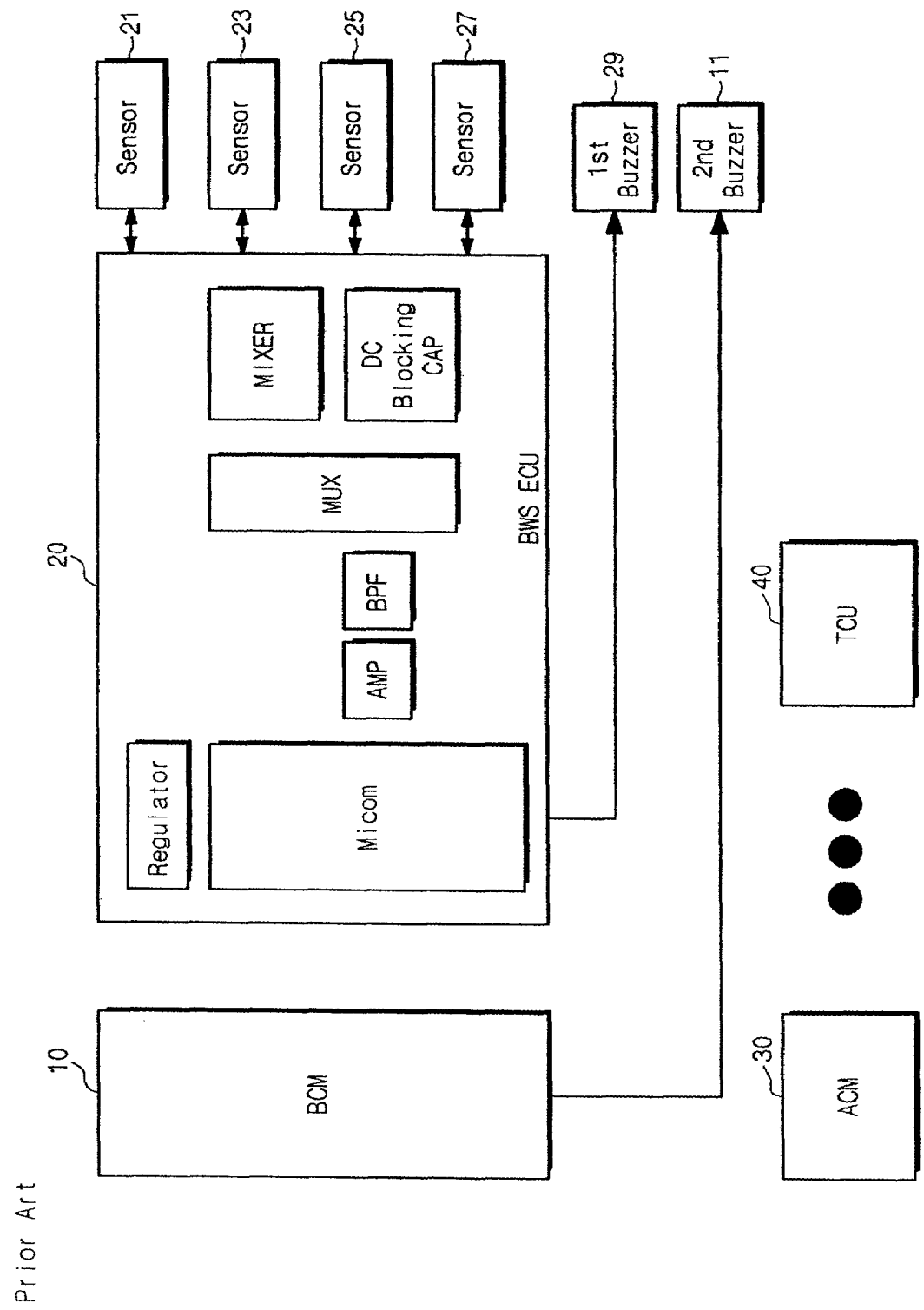
FIG. 1 is a block diagram illustrating a schematic construction of a conventional vehicular electronic system.
Figure 2:
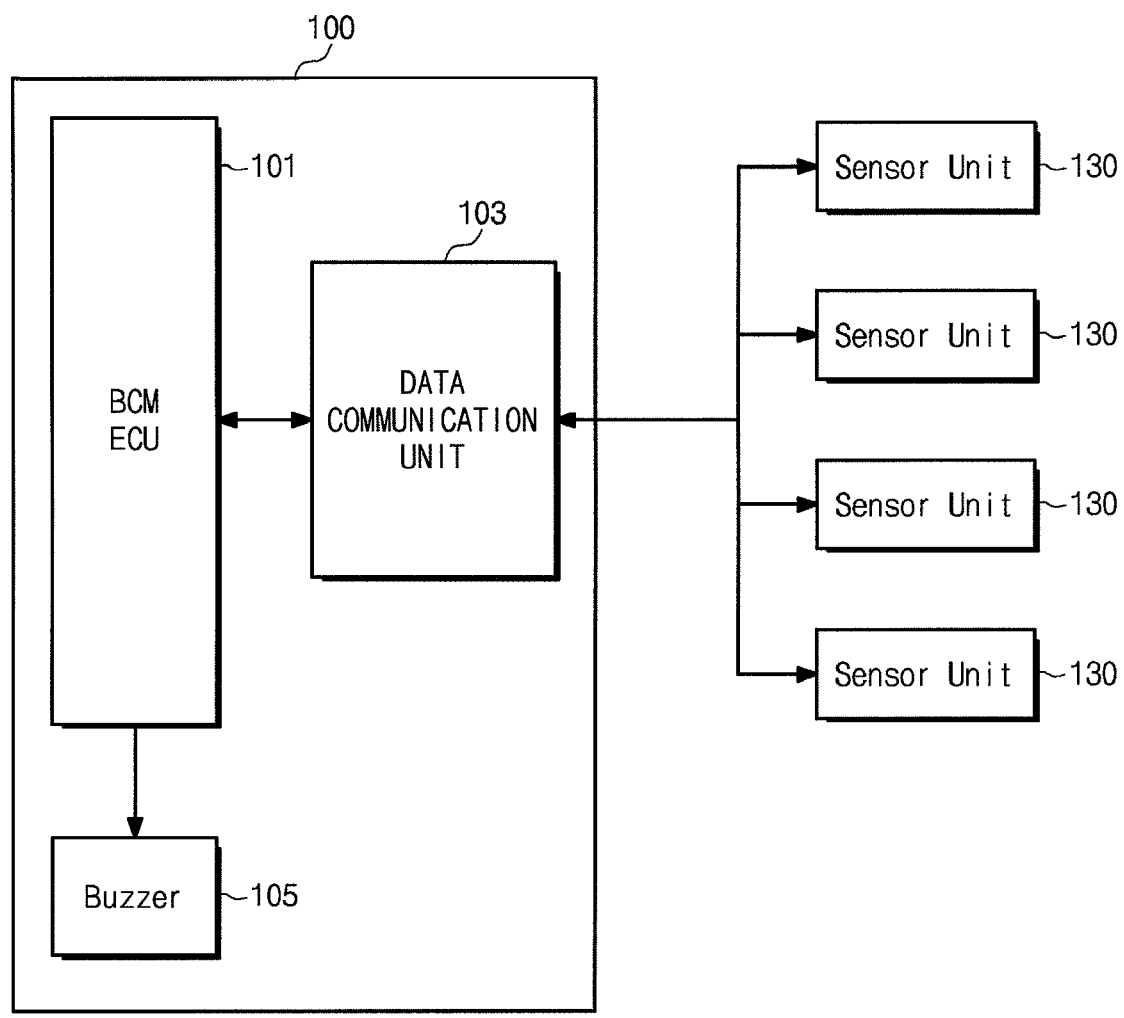
FIG. 2 is a block diagram illustrating a back warning system using a Body Control Module (BCM) system according to the present invention.

FIG. 2 is a block diagram illustrating a back warning system for a vehicle using a body control module system according to the present invention.

Referring to FIG. 2, the back warning system includes a BCM 100 and a plurality of sensor units 130.

The BCM 100 includes a BCM ECU 101, a data communication unit 103, and a buzzer 105 that is an alarm.

The BCM ECU 101 controls a general operation for car body control and controls back warning operation according to the present invention. In detail, if a condition for back warning operation according to the present invention is satisfied, the BCM ECU 101 generates and transmits a back warning sensor drive message to the plurality of sensor units 130 through the data communication unit 103. After transmitting the drive message, upon receiving a warning message, the BCM ECU 101 controls the buzzer 105 to generate a warning based on a warning level value included in the received warning message. The condition for back warning operation, a general condition of a back warning system, represents a condition in which a driver shifts into reverse gear (R) with starting an engine. A technology of construction for detecting whether the engine starts and the driver shifts into the reverse gear (R) is well known in the art and therefore, its description is omitted.

The data communication unit 103 performs data communication in compliance with a Local Interconnect Network (LIN) or Controller Area Network (CAN) protocol.

The buzzer 105 generates a warning under the control of the BCM ECU 101.

The sensor unit 130 is manufactured using an Application Specific Integrated Circuit (ASIC) to minimize a size and perform a control such as measuring a distance from a rear obstacle. Upon receiving a back warning sensor drive message from the BCM 100, the sensor units 130 are driven to generate an ultrasonic wave, measuring a distance to the rear obstacle using an ultrasonic wave generation time and a reflection-to-reception time. If the distance is measured, the sensor unit 130 searches a lookup table for a predefined warning level value corresponding to the measured distance value. When searching for the warning level value, the sensor unit 130 generates and transmits a warning message including the warning level value to the BCM 100.

Figure 3:
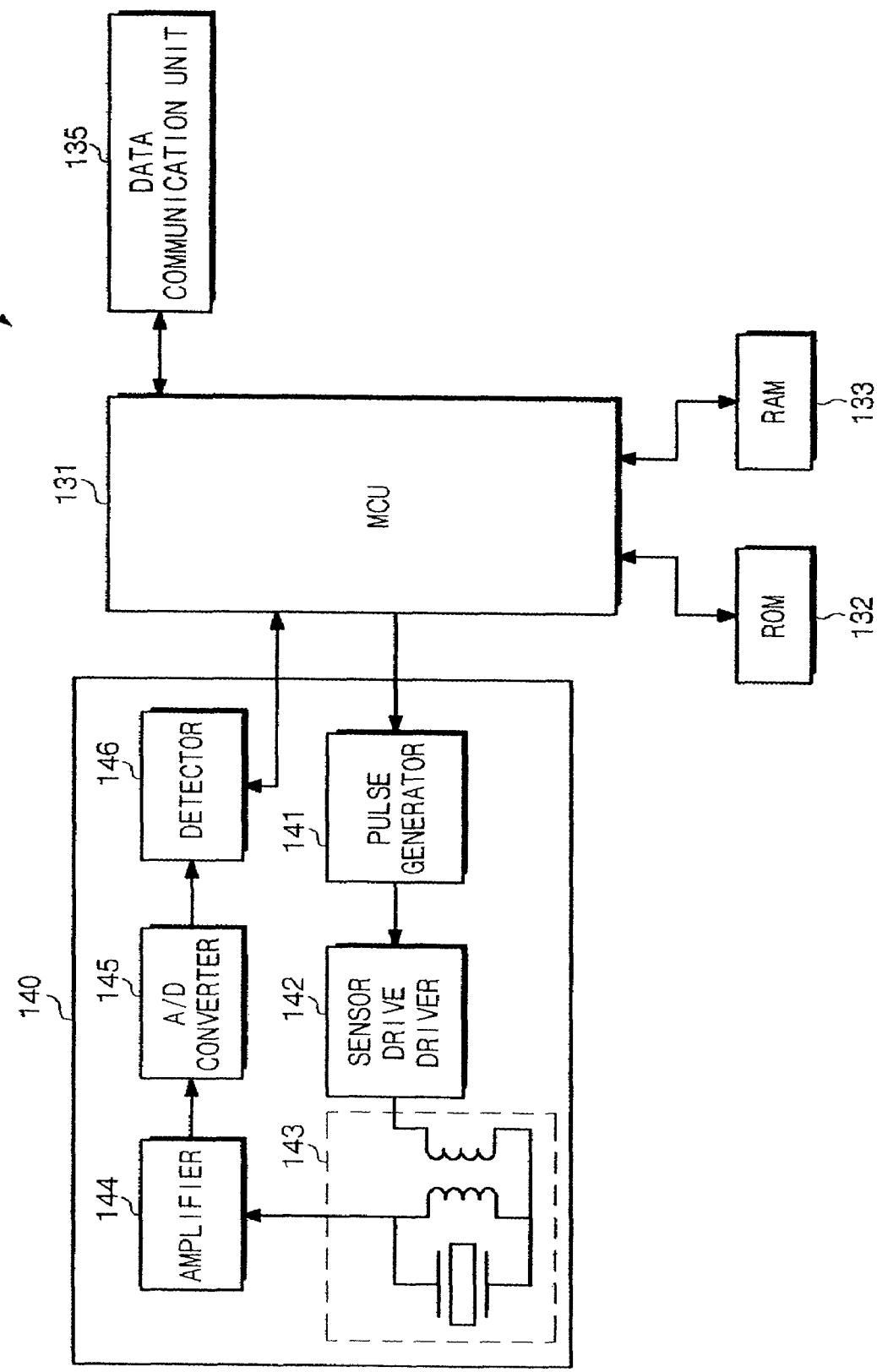
FIG. 3 is a block diagram illustrating a detailed construction of a sensor unit of FIG. 2.

FIG. 3 is a block diagram illustrating a detailed construction of the sensor unit 130 of FIG. 2. The detailed construction of the sensor unit 130 is described below with reference to FIG. 3.

The sensor unit 130 includes a Micro Control Unit (MCU) 131, a Read Only Memory (ROM) 132, a Random Access Memory (RAM) 133, a data communication unit 135, and a sensing unit 140.

The MCU 131 controls a general operation of the sensor unit 130 according to the present invention. In particular, when receiving a sensor drive message through the data communication unit 135, the MCU 131 drives the sensing unit 140 to sense a distance to a rear obstacle, generates a warning message including a warning level value corresponding to the sensed distance value, and transmits the warning message to the BCM 100 through the data communication unit 135.

The ROM 132 stores a control program for controlling operation of the sensor unit 130 and a lookup table that is a definition of warning level values depending on distance values.

The RAM 133 temporarily stores data generated during operation of the control program.

The sensing unit 140 includes a pulse generator 141, a sensor drive driver 142, a sensor 143, an amplifier 144, an Analog-to-Digital Converter (ADC) 145, and a detector 146. The pulse generator 141 generates pulses under the control of the MCU 131. The sensor drive driver 142 receives the pulses and drives the sensor 143. Under the control of the sensor drive driver 142, the sensor 143 generates and transmits an ultrasonic wave and receives a reflected ultrasonic wave. The amplifier 144 amplifies a received ultrasonic wave signal. The ADC 145 converts the amplified ultrasonic wave signal into an 8-bit digital signal. The detector 146 detects a sensed distance value from the 8-bit digital signal. The sensor 143 is an ultrasonic sensor in the present invention.

The data communication unit 135 corresponds to the data communication unit 103 of the BCM 100 and performs data communication with the data communication unit 103 of the BCM 100 in compliance with the LIN or CAN protocol.

A case where the sensor units 130 are driven when receiving a back warning sensor drive message from the BCM 100 has been described in FIGS. 2 and 3. Unlike this, in a second exemplary embodiment of the present invention, it can be also configured that sensor units 130 are driven when receiving power by starting up an engine or receiving power by a separate manipulation without receiving a back warning sensor drive message from a BCM 100. Here, the BCM 100 has to be configured to, when a condition for back warning operation is satisfied, monitor a reception or non-reception of a warning message and generate a warning based on a warning level value included in the warning message received during the monitoring.

Also, construction of the sensor unit 130 configured to include the lookup table, which is the definition of the warning level values depending on the distance values, and transmit a warning message having a warning level value corresponding to a measured distance value has been described above. Unlike this, in a third exemplary embodiment of the present invention, it can be configured that a sensor unit 130 transmits a warning message including a measured distance value and a BCM 100 includes a lookup table that is a definition of warning level values depending on distance values, searches the lookup table for a warning level value corresponding to a measured distance value included in a warning message, and generates a warning based on the searched warning level value.

Figure 4:
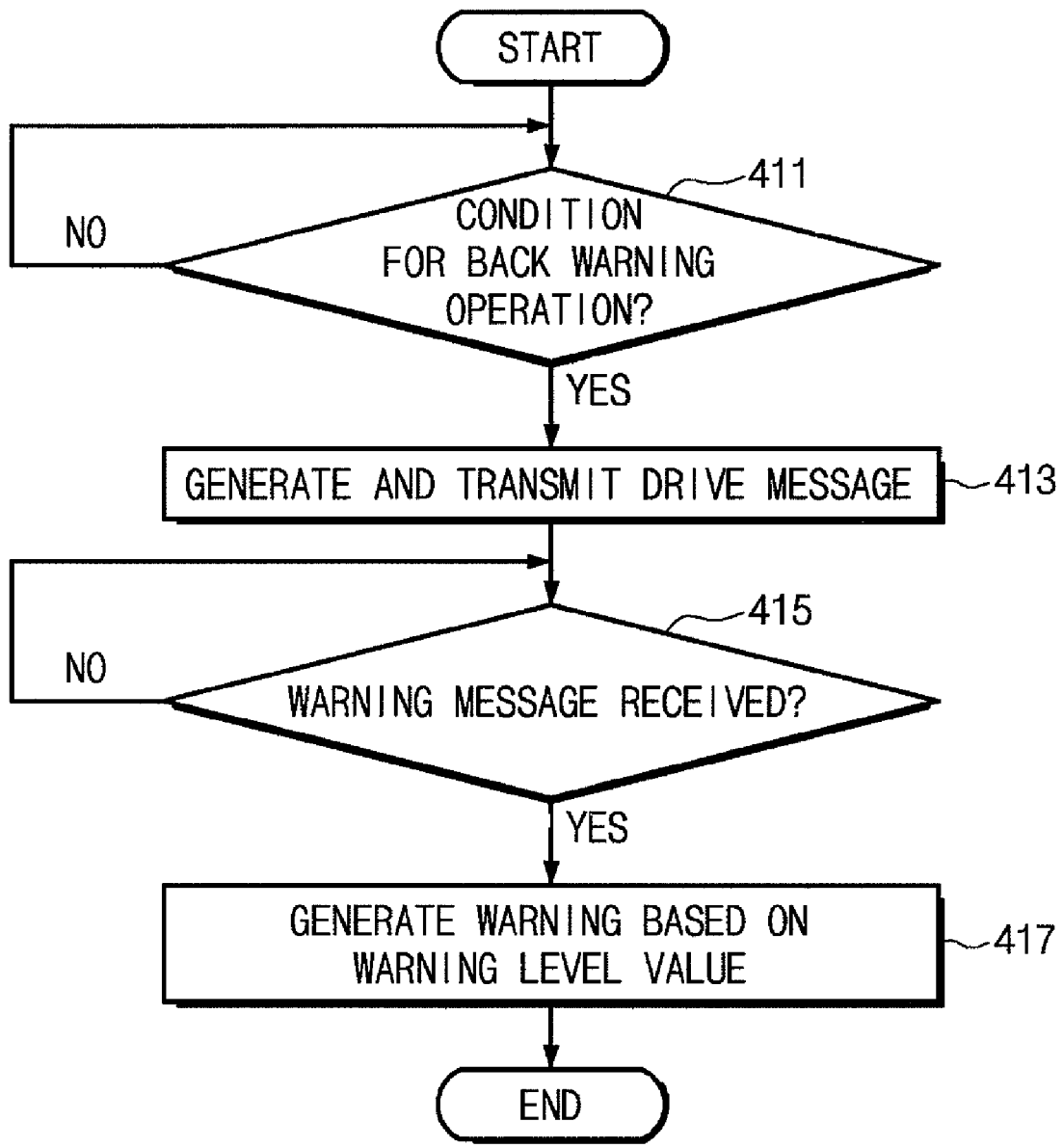
FIG. 4 is a flow diagram illustrating operation of a BCM for performing a back warning according to the present invention.

FIG. 4 is a flow diagram illustrating operation of the BCM 100 of the back warning system for performing a back warning according to the present invention. A description is made with reference to FIGS. 2 and 3 below.

First, the BCM ECU 101 checks whether a condition for back warning operation is satisfied in step 411.

If the condition is satisfied in step 411, the BCM ECU 101 generates and transmits a back warning sensor drive message to each of the sensor units 130 through the data communication unit 103 in step 413.

After transmitting the drive message, the BCM ECU 101 checks whether it receives a warning message through the data communication unit 103 in step 415.

Upon receiving the warning message, the ECU 101 detects a warning level from the warning message and generates a warning based on the detected warning level through the buzzer 105 in step 417. The warning level refers to a volume level or a frequency level of generation of a warning sound. In detail, the ECU 101 changes a sound volume or changes the frequency of generation through frequency adjustment according to a warning level, thereby generating a warning sound using the buzzer 105.

In the second exemplary embodiment of the present invention, step 413 can be omitted from FIG. 4. That is, if a condition for back warning operation is satisfied in step 411, a BCM ECU 101 checks whether it receives a warning message through a data communication unit 103 in step 415. If receiving the warning message, the BCM ECU 101 generates a warning based on a warning level in step 417.

The third exemplary embodiment of the present invention should further include an additional process (not shown) of searching a previously stored lookup table for a warning level value corresponding to a distance value because a warning message includes only the distance value excepting a warning level value. If searching the lookup table for the warning level value, the ECU 101 generates a warning based on the searched warning level value in step 417.

Figure 5:
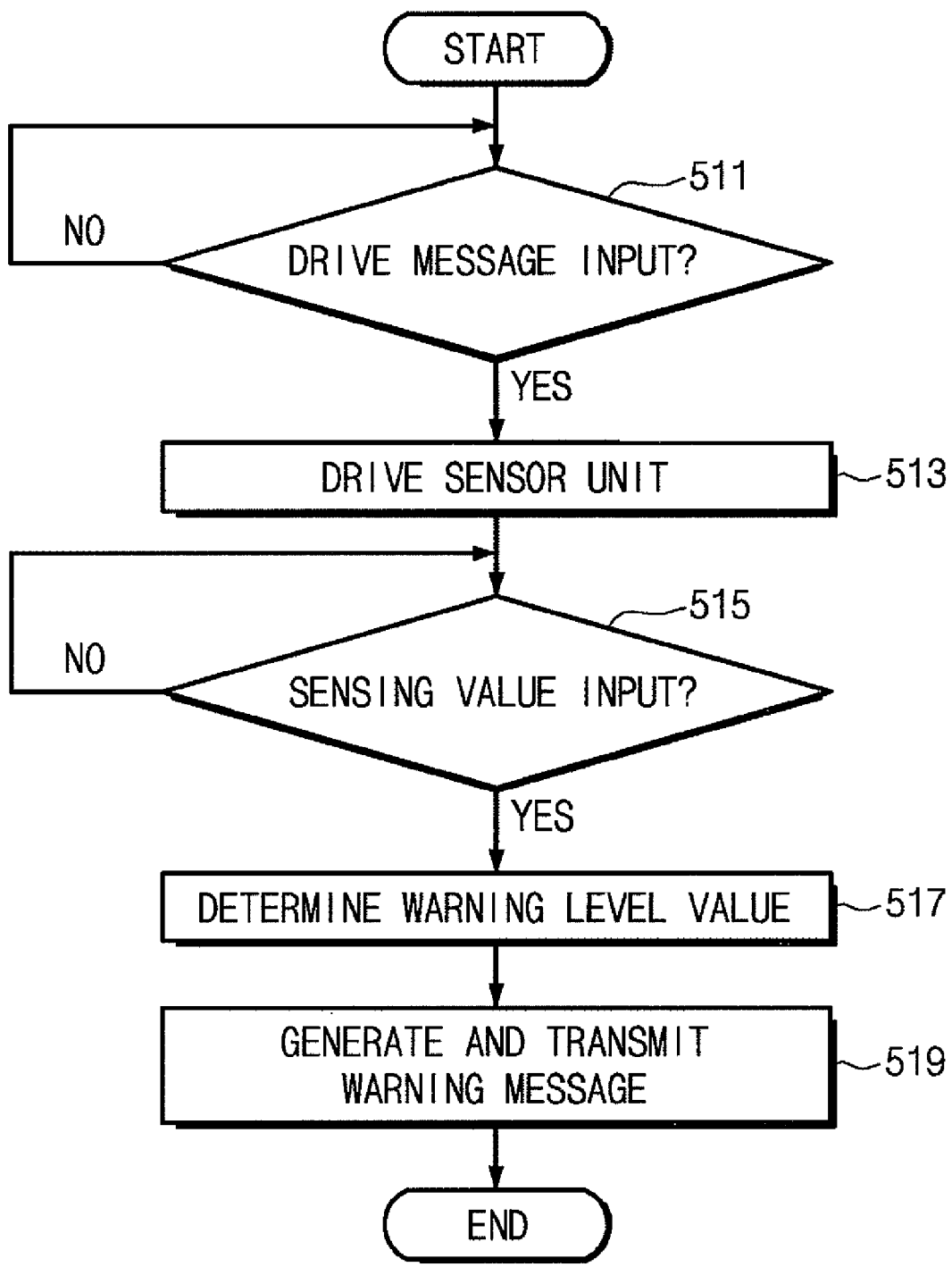
FIG. 5 is a flow diagram illustrating operation of a sensor unit for performing a back warning according to the present invention.

FIG. 5 is a flow diagram illustrating operation of the sensor unit for performing a back warning according to the present invention. A description is made below with reference to FIGS. 3 and 5.

First, the MCU 131 checks whether it receives a back warning sensor drive message through the data communication unit 135 in step 511.

Upon receiving the drive message in step 511, the MCU 131 drives the sensing unit 140 in step 513 and checks whether it receives a sensing value, that is, a measured distance value from the detector 146 in step 515.

Upon receiving the measured distance value in step 515, the MCU 131 searches a lookup table previously stored in the ROM 132 for a warning level value corresponding to the measured distance value in step 517.

If searching for the warning level value, the MCU 131 generates and transmits a warning message including the searched warning level value to the BCM 100 through the data communication unit 135 in step 519.

In the second exemplary embodiment of the present invention, an MCU 131 does not check whether it receives a back warning sensor drive message but determines whether it receives power in step 511. If the power is supplied, steps of FIG. 5 subsequent to step 513 are implemented identically.

In the third exemplary embodiment of the present invention, if receiving a distance value that is a sensing value in step 515 of FIG. 5, an MCU 131 does not determine a warning level in step 517 but generates and transmits a warning message including the received distance value to the BCM 100 through the data communication unit 135 in step 519.

As described above, the present invention has an advantage of being capable of securing a space to install other additional electronic systems by dispersing the control function of the back warning system to each of the sensors and providing construction that other electronic systems have charge of the warning function of the back warning system. The present invention has an advantage of being capable of securing a space and reducing a weight of a vehicle because the number of electric lines decrease owing to dispersion of function and integration with other electronic systems.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A back warning system, for a vehicle, comprising:
an electronic system for, when the vehicle is backed, transmitting a sensor drive message and then generating a warning based on a received warning level; and
a plurality of sensor units being driven upon receiving the sensor drive message, sensing a distance from a rear obstacle, and transmitting a warning level corresponding to the sensed distance to the electronic system;
wherein the electronic system comprises:
  a buzzer for generating a warning based on the warning level;
  a data communication unit for performing data communication; and
  an electronic control unit for determining whether the vehicle is backed, transmitting the sensor drive message through the data communication unit when the vehicle is backed, and controlling the buzzer to generate a warning based on a warning level received through the data communication unit;
wherein the sensor unit comprises:
  a data communication unit for performing data communication with the data communication unit of the electronic system;
  a sensing unit for generating an ultrasonic wave and measuring the distance from the rear obstacle;
  a Read Only Memory (ROM) for storing a lookup table that is a definition of warning levels for a distance; and
  a Micro Control Unit (MCU) for, upon receipt of the sensor drive message through the data communication unit, driving the sensing unit to measure a distance, searching the lookup table for a warning level depending on the measured distance, and transmitting the searched warning level to the electronic system through the data communication unit; and
wherein the sensing unit comprises:
  a sensor for generating and transmitting an ultrasonic wave and receiving a reflected ultrasonic wave that reflects and returns from the rear obstacle;
  a pulse generator for generating pulses under the control of the MCU;
  a sensor drive driver for receiving the pulses and driving the sensor;
  an amplifier for amplifying the reflected ultrasonic wave output from the sensor;
  an Analog-to-Digital Converter (ADC) for converting the amplified ultrasonic wave into an 8-bit digital signal; and
  a detector for detecting a distance value to the rear obstacle from the 8-bit digital signal.

2. The system of claim 1, wherein the electronic system and the data communication unit of the sensor unit perform data communication in compliance with a Local Interconnect Network (LIN) protocol.

3. The system of claim 2, wherein the electronic system is a Body Control Module (BCM).

4. The system of claim 2, wherein the sensor unit is an Application Specific Integrated Circuit (ASIC).

5. The system of claim 1, wherein the electronic system and the data communication unit of the sensor unit perform data communication in compliance with a Controller Area Network (CAN) protocol.

6. The system of claim 5, wherein the electronic system is a Body Control Module (BCM).

7. The system of claim 5, wherein the sensor unit is an Application Specific Integrated Circuit (ASIC).

8. A back warning system for a vehicle, comprising:
a plurality of sensor units for, when power is supplied, measuring a distance to a rear obstacle and generating and transmitting a warning message comprising a warning level corresponding to the measured distance; and
an electronic system for, when the vehicle is backed, generating a warning based on a warning level comprised in the warning message received from the sensor units;
wherein the electronic system comprises:
  a buzzer for generating a warning based on the warning level;
  a data communication unit for performing data communication; and an electronic control unit for determining whether the vehicle is backed and, when the vehicle is backed, controlling the buzzer to generate a warning based on a warning level received through the data communication unit;

wherein the sensor unit comprises:
a data communication unit for performing data communication with the data communication unit of the electronic system;
a sensing unit for generating an ultrasonic wave and measuring the distance from the rear obstacle;
a Read Only Memory (ROM) for storing a lookup table that is a definition of warning levels for a distance; and
a Micro Control Unit (MCU) for, when the power is supplied and the sensor drive message is received through the data communication unit, driving the sensing unit to measure a distance, searching the lookup table for a warning level according to the measured distance, and transmitting the warning message comprising the searched warning level to the electronic system through the data communication unit; and wherein the sensing unit comprises:
a sensor for generating and transmitting an ultrasonic wave and receiving a reflected ultrasonic wave that reflects and returns from the rear obstacle;
a pulse generator for generating pulses under the control of the MCU;
a sensor drive driver for receiving the pulses and driving the sensor;
an amplifier for amplifying the reflected ultrasonic wave output from the sensor;
an Analog-to-Digital Converter (ADC) for converting the amplified ultrasonic wave into an 8-bit digital signal; and
a detector for detecting a distance value to the rear obstacle from the 8-bit digital signal.

9. The system of claim 8, wherein the electronic system and the data communication unit of the sensor unit perform data communication in compliance with a Local Interconnect Network (LIN) protocol.

10. The system of claim 9, wherein the electronic system is a Body Control Module (BCM).

11. The system of claim 9, wherein the sensor unit is an Application Specific Integrated Circuit (ASIC).

12. The system of claim 8, wherein the electronic system and the data communication unit of the sensor unit perform data communication in compliance with a Controller Area Network (CAN) protocol.

13. The system of claim 12, wherein the electronic system is a Body Control Module (BCM).

14. The system of claim 12, wherein the sensor unit is an Application Specific Integrated Circuit (ASIC).

* * * * *